(12) United States Patent
Nazarov et al.

(10) Patent No.: US 9,058,823 B2
(45) Date of Patent: Jun. 16, 2015

(54) PROTECTED TRANSDUCER FOR DEAD LAYER REDUCTION

(75) Inventors: Alexey V. Nazarov, Westminster, CO (US); Vladyslav Alexandrovich Vasko, Apple Valley, MN (US); Olle Gunnar Heinonen, Eden Prairie, MN (US); Lijuan Zou, Eden Prairie, MN (US); Thomas R. Boonstra, Chaska, MN (US); Xilin Peng, Bloomington, MN (US); Kaizhong Gao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 1194 days.

(21) Appl. No.: 12/502,179

(22) Filed: Jul. 13, 2009

(65) Prior Publication Data

US 2011/0007422 A1  Jan. 13, 2011

(51) Int. Cl.
 C23C 14/00 (2006.01)
 C23C 14/32 (2006.01)
 G11B 5/31 (2006.01)
(52) U.S. Cl.
 CPC ............ *G11B 5/3116* (2013.01); *G11B 5/3106* (2013.01); *G11B 5/3163* (2013.01)
(58) Field of Classification Search
 CPC ..................................................... G11B 5/3116
 See application file for complete search history.

(56) References Cited

U.S. PATENT DOCUMENTS

| | | | |
|---|---|---|---|
| 5,734,531 A * | 3/1998 | Nix et al. ....................... | 360/317 |
| 6,519,119 B1 * | 2/2003 | van der Heijden et al. ... | 360/324 |
| 6,687,085 B2 | 2/2004 | Minor et al. | |
| 6,995,961 B2 | 2/2006 | Hasegawa et al. | |
| 6,998,061 B1 | 2/2006 | Cross | |

(Continued)

FOREIGN PATENT DOCUMENTS

| | | |
|---|---|---|
| JP | 2007184022 A | 7/2007 |
| JP | 2007213784 A | 8/2007 |
| JP | 2008210481 A | 9/2008 |

OTHER PUBLICATIONS

Japanese Office Action dated Oct. 2, 2012 from Japanese Patent Application No. 2010-158107.

(Continued)

*Primary Examiner* — Keith Hendricks
*Assistant Examiner* — Ibrahime A Abraham
(74) *Attorney, Agent, or Firm* — Westman, Champlin & Koehler, P.A.

(57) ABSTRACT

A transducer includes magnetic material formed on a substrate that is shaped to include a trailing edge, a leading edge and a pair of opposing sidewalls extending between the trailing edge and the leading edge. A layer of protective material is positioned in contact with each of the pair of sidewalls of the shaped magnetic material. Backfill material surrounds the protective material on each of the pair of sidewalls of the shaped magnetic material.

16 Claims, 11 Drawing Sheets

(56) References Cited

U.S. PATENT DOCUMENTS

| | | |
|---|---|---|
| 7,002,782 B2 | 2/2006 | Hasegawa et al. |
| 7,228,619 B2 | 6/2007 | Le |
| 7,292,409 B1 | 11/2007 | Stoev et al. |
| 7,367,110 B2 | 5/2008 | Cyrille et al. |
| 7,382,573 B2 | 6/2008 | Carey et al. |
| 2002/0080690 A1* | 6/2002 | Belser et al. ............... 369/13.55 |
| 2007/0081279 A1 | 4/2007 | Hong et al. |
| 2007/0242389 A1 | 10/2007 | Balamane et al. |
| 2008/0002291 A1 | 1/2008 | Balamane et al. |
| 2008/0062579 A1 | 3/2008 | Yasui et al. |
| 2008/0072417 A1 | 3/2008 | Hsu et al. |
| 2008/0100959 A1 | 5/2008 | Feldbaum et al. |
| 2010/0108636 A1* | 5/2010 | Peng et al. ....................... 216/13 |
| 2010/0330707 A1* | 12/2010 | Jiang et al. ....................... 438/3 |

OTHER PUBLICATIONS

Chinese Office Action dated Sep. 15, 2011 from Chinese Patent Application No. 201010278034.9.

Second Chinese Office Action dated Jul. 23, 2012 from Chinese Patent Application No. 201010278034.9.

* cited by examiner

PROTECTED TRANSDUCER FOR DEAD LAYER REDUCTION

BACKGROUND

A typical data electronics enclosure includes a rigid housing that encloses a variety of components. A data storage system is one type of electronics enclosure. Components in a data storage system include one or more storage media. For example, storage media can be mounted on a spindle motor that causes the media to spin and the data surfaces of the discs to pass under aerodynamic bearing head sliders. The head sliders are supported on an actuator having at least one arm and at least one corresponding suspension that moves across each medium using mechanical energy derived from a voice coil motor. The sliders carry transducers, which write information to and read information from the data surfaces of the media.

With the never-ending need to increase the areal density of a medium, transducer size is constantly shrinking. For example, the width of magnetic transducers, such as reader sensors and write poles are becoming smaller to accommodate the smaller track size on the medium.

In general, both reader sensors and write poles are defined via some type of ion milling, such as ion beam etching (IBE). However, after the reader sensor and the write pole are defined, formation of reaction zones or dead layers of an uncontrolled thickness occur on the sides of the device.

Formation of dead layers can be caused by various reasons. For example, argon beams bombard the sidewalls of the device during ion milling and can cause ion induced physical damage. In another example, after the reader sensor or the write pole is defined by ion milling, the ion milled devices are exposed to atmosphere for transition to other fabricating processes. Due to the atmospheric exposure of the freshly ion milled device, oxygen and water moisture can readily react with the device edges. In yet another example, subsequent oxidation to the sidewalls can occur from an alumina hard mask or other layers of alumina.

Dead layers provide the device with a reduced magnetic moment. In the case of a write pole, dead layers can cause the write pole to write more curved transitions compared to a write pole without dead layers. In the case of a reader, the resistance of the device can vary depending on the thickness of the dead layer and, therefore, the edge effect of the reader is critical. Controlling or eliminating an edge reaction zone in write poles and readers is important for reader/writer performance control.

The discussion above is merely provided for general background information and is not intended to be used as an aid in determining the scope of the claimed subject matter.

SUMMARY

Disclosed are embodiments of a protected transducer and its fabrication. One embodiment of the transducer includes magnetic material formed on a substrate that is shaped to include a trailing edge, a leading edge and a pair of opposing sidewalls extending between the trailing edge and the leading edge. A layer of protective material is positioned in contact with each of the pair of sidewalls of the shaped magnetic material. Backfill material surrounds the protective material on each of the pair of sidewalls of the shaped magnetic material.

To fabricate one embodiment of the transducer, a first intermediate structure is obtained that includes the magnetic material formed on the substrate and the mask deposited on the magnetic material. Defined between the magnetic material and the mask includes a stop plane dividing the structure into a first portion and a second portion. At least one shaping operation is performed on the first intermediate structure to form a second intermediate structure. A first protective layer of non-magnetic material is deposited on the second intermediate structure to form a third intermediate structure. The third intermediate structure is backfilled with an insulating material to form a fourth intermediate structure. The first portion of the structure is removed at the stop plane including a portion of the backfilled insulating material, the mask and a portion of the first protective layer to form a fifth intermediate structure.

To fabricate another embodiment of the transducer, a first intermediate structure is obtained that includes the magnetic material formed on the substrate and the mask deposited on the magnetic material. A first shaping operation on the first intermediate structure is performed using ion beam bombardment at a first level of energy to form a second intermediate structure. Material of the substrate is redeposited on and in contact with the sidewalls of the shaped magnetic material in the second intermediate structure using ion beam bombardment to form a protective layer.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments of the disclosure pertain to the elimination or minimization of edge reaction zone or dead layers that can occur during fabrication of a magnetic device. The magnetic device can be related to any type of transducer, such as a read or a write transducer. However, in the disclosure, exemplary embodiments of the fabrication of a write pole are particularly described.

Figure 1:
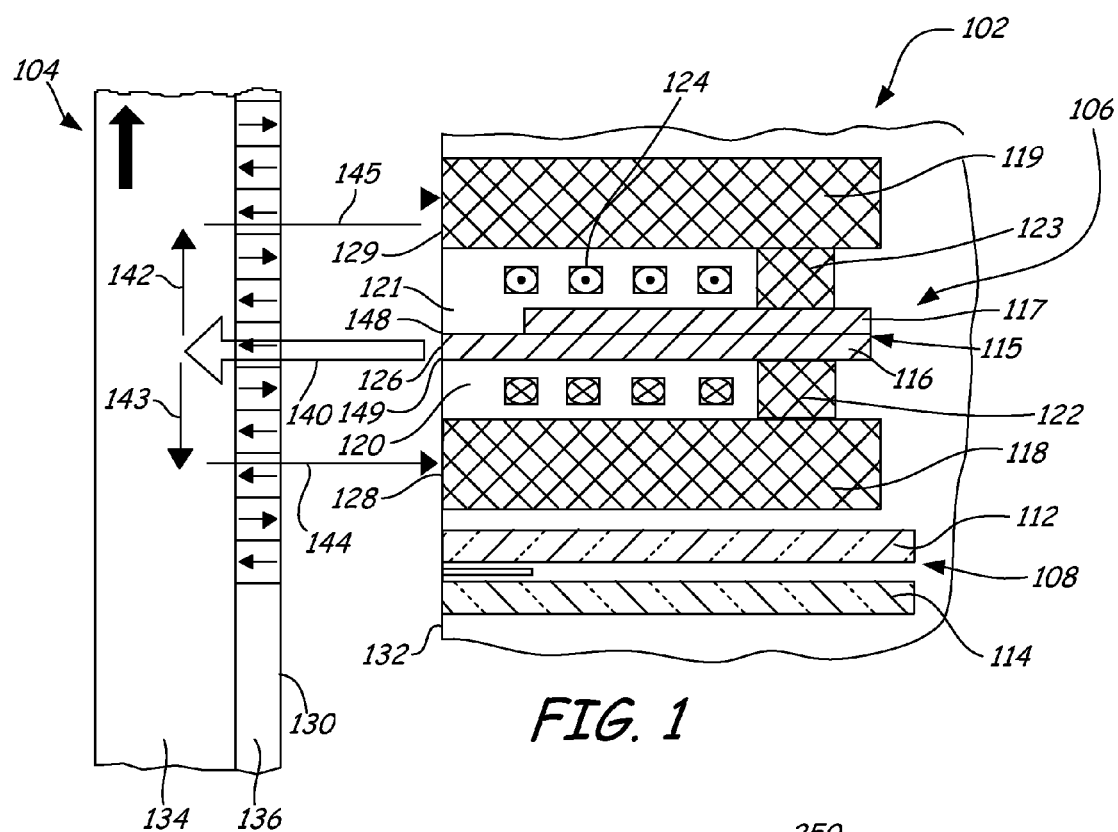
FIG. 1 illustrates a partial sectional view of an example read/write transducer for perpendicular recording to a medium.

FIG. 1 illustrates a partial sectional view of an example read/write transducer 102 for perpendicular recording to a medium 104. In FIG. 1, all spacing and insulating layers are omitted for clarity. Read/write transducer 102 includes a writing element 106 and a reading element 108 formed on a trailing edge of a slider (not shown in FIG. 1). Reading element 108 includes a read sensor 110 that is spaced between a top shield 112 and a bottom shield 114. Top and bottom shields 112 and 114 operate to isolate read sensor 110 from external magnetic fields that could affect sensing bits of data that have been recorded on medium 104.

Writing element 106 includes a write pole 115, a first return pole 118 and a second return pole 119. Write pole 115 includes a main portion 116 having a write pole tip 126. Pole tip 126 includes a trailing edge 148 and a leading edge 149. Write pole 115 also includes a yoke portion 117. First return pole 118 includes a first return pole tip 128 and is separated from write pole 115 by a first spacer 120. First return pole 118 is connected to write pole 115 at a first back gap closure 122. First return pole 118 is spaced apart from leading edge 149 of write pole tip 126. Second return pole 119 is positioned on the opposite side of write pole 115 than from first return pole 118. In particular, second return pole 119 is spaced apart from trailing edge 148 of write pole tip 126. Second return pole 119, having a second return pole tip 129, is separated from write pole 115 by a second spacer 121 and connected at a second back gap closure 123. Main, first return and second return pole tips 126, 128 and 129, respectively, face a surface 130 of medium 104 and form a portion of an air bearing surface (ABS) 132 of a slider.

A conductive coil 124 wraps around write pole 115 to extend between write pole 115 and first return pole 118 and between write pole 115 and second return pole 119. An insulating material (not shown) electrically insulates conductive coil 124 from write pole 115 and first return pole 118 and from write pole 115 and second return pole 119. One of ordinary skill in the art should understand that other configurations of conductive coil 124 are possible. For example, conductive coil 124 could be two conductive coils. One coil could extend between first return pole 118 and write pole 115 and around back gap closure 122 and one coil could extend between second return pole 119 and write pole 115 and around back gap closure 123.

FIG. 1 illustrates read element 108 having separate top and bottom shields 112 and 114 from write element 106. However, it should be noted that in other read/write transducers, return pole 118 can operate as a top shield for reading element 108. In addition, it should be noted that portions of write element 106 can also be shielded.

A magnetic circuit is formed in writing element 106 by write pole 115, first return pole 118, second return pole 119, back gap closures 122 and 123 and a soft magnetic layer 134 of medium 104, which underlays a hard magnetic or storage layer 136 having a perpendicular orientation of magnetization. Storage layer 136 includes uniformly magnetized regions 138, each of which represent a bit of data in accordance with an up or down orientation. In operation, an electrical current is caused to flow in conductive coil 124, which induces a magnetic flux that is conducted through the magnetic circuit. The magnetic circuit causes the magnetic flux to travel vertically through the main pole tip 126 and storage layer 136 of the recording medium, as indicated by arrow 140. Next, the magnetic flux is directed horizontally through soft magnetic layer 134 of the recording medium, as indicated by arrows 142 and 143, then vertically back through storage layer 136 through first return pole tip 128 of first return pole 118 and through second return pole tip 129 of second return pole 119, as indicated by arrows 144 and 145. Finally, the magnetic flux is conducted back to write pole 115 through back gap closures 122 and 123.

Main pole tip 126 is shaped to concentrate the magnetic flux traveling there through to such an extent that the orientation of magnetization in patterns 138 of storage layer 136 are forced into alignment with the writing magnetic field and, thus, cause bits of data to be recorded therein. In general, the magnetic field in storage layer 136 at main pole tip 126 must be twice the coercivity or saturation field of that layer. Medium 104 rotates in the direction indicated by arrow 146. A trailing edge 148 of write pole 116 operates as a "writing edge" that defines the transitions between bits of data recorded in storage layer 136, since the field generated at that edge is the last to define the magnetization orientation in the pattern 138.

Shielded write poles increase the field gradient at trailing edge 148 and improve transition quality. A curvature of transitions recorded with a shield write pole is smaller than those recorded without shields. However, even with the shields, write pole still produces transitions that are not straight. Improvement in transition quality can be further achieved using a high moment magnetic material for the entire area of the pole at the air bearing surface and especially at the trailing edge of the air bearing surface. Interaction with ion milling, exposure to air and subsequent backfill deposition are all instances in the fabrication of a write pole or other type of transducer that can cause formation of dead layers on the sidewalls and edges of the write pole. Dead layers prevent the write pole from writing straight transitions compared to a write pole without dead layers.

Figure 2:
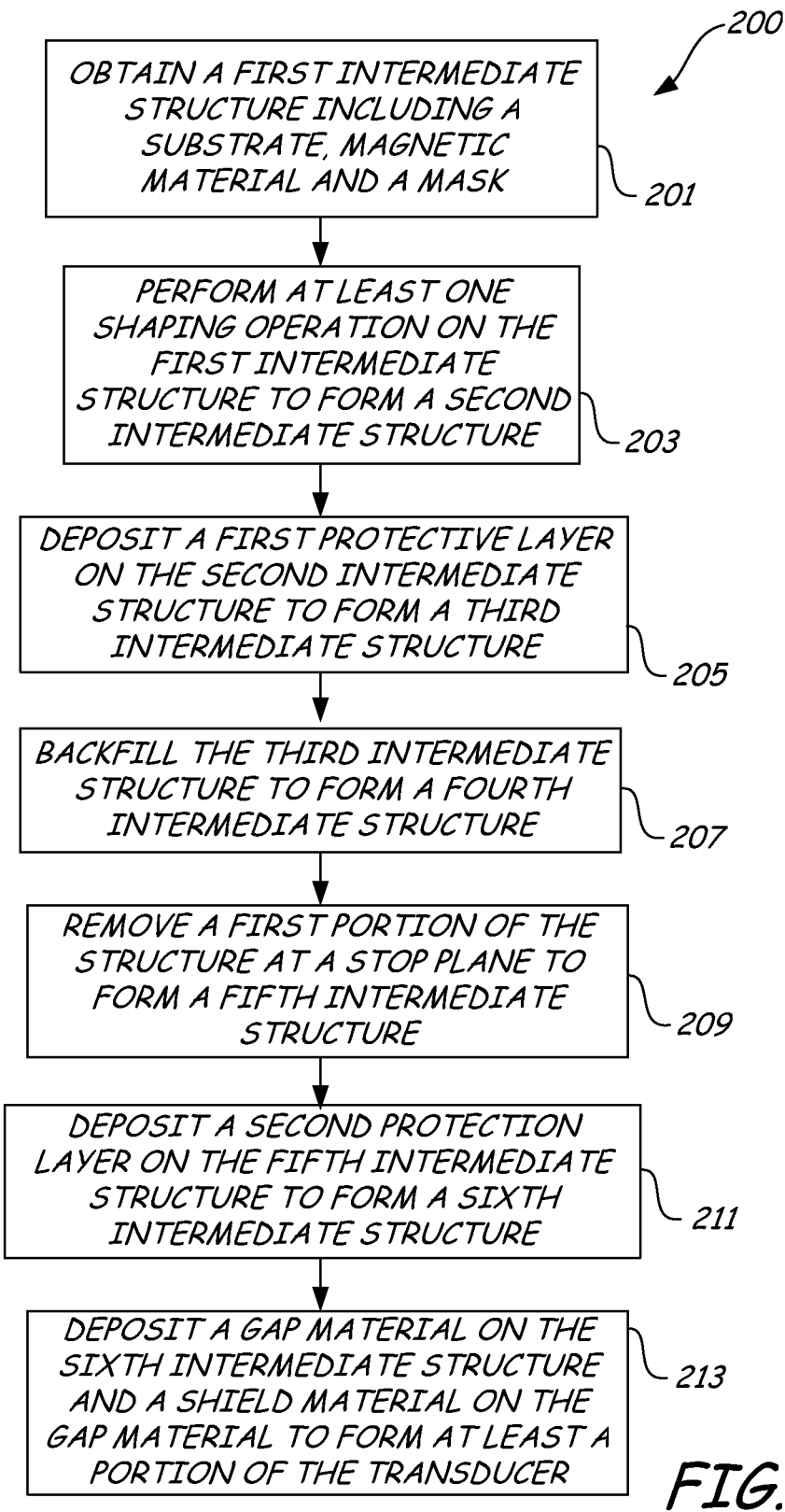
FIG. 2 is a flowchart illustrating a method of fabricating a transducer under one embodiment.

FIG. 2 is a flowchart 200 illustrating one embodiment of a method of fabricating a transducer, such as transducer 102 of FIG. 1. In particular, flowchart 200 describes the method of fabricating a write pole, such as write pole 116 illustrated in FIG. 1. Flowchart 200 will be discussed in combination with the intermediate structures illustrated in FIGS. 2-9.

Figure 3:
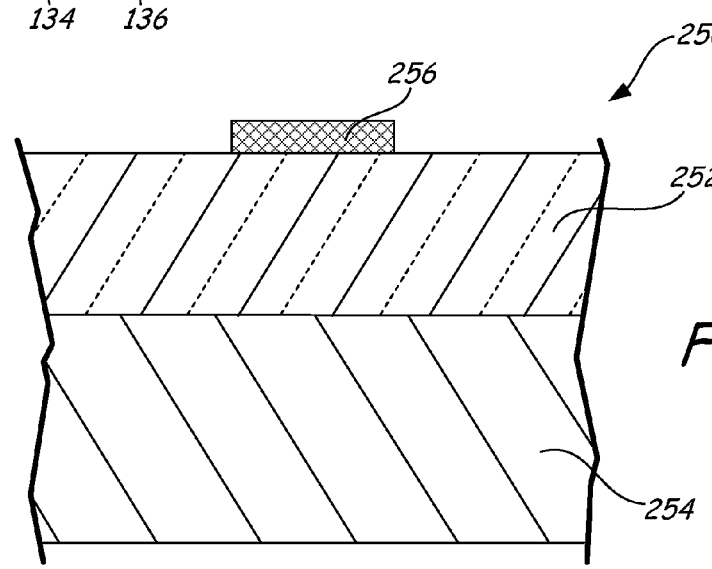
FIG. 3 illustrates a first intermediate structure formed during fabrication of the transducer in FIG. 2.

At block 201, a first intermediate structure 250, as illustrated in FIG. 3, is obtained. First intermediate structure 250 includes a magnetic material 252 formed on a substrate 254. Magnetic material 252 can be FeCo or other type of 2.4 T iron cobalt. Substrate 254 can be alumina ($Al_2O_3$) or other type of insulation material. First intermediate structure 250 also includes a mask 256 deposited on magnetic material 252. For example, mask 256 can be a photo resist or hard mask. Mask 256 is configured for use in defining the width of the write pole that is to be fabricated. In general, the width of the write pole should correspond to the width of a track on the storage medium.

Figure 4:
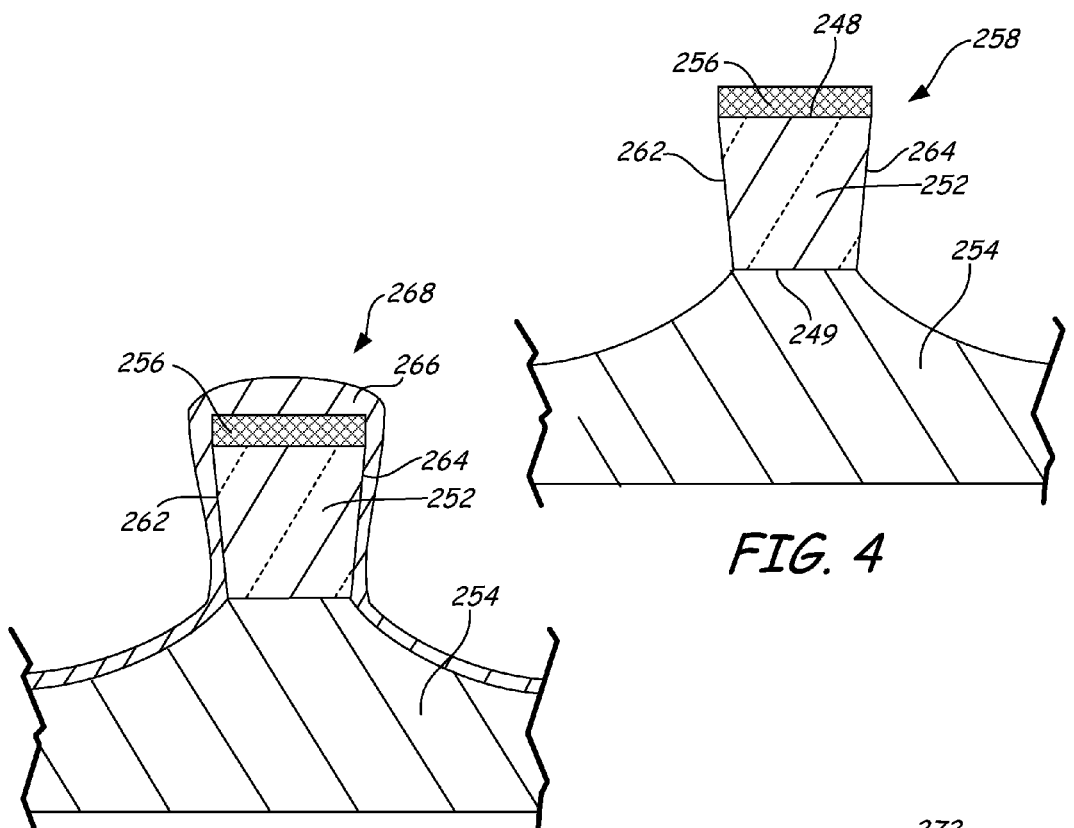
FIG. 4 illustrates a second intermediate structure formed during the fabrication of the transducer in FIG. 2.

At block 203, at least one shaping operation is performed on first intermediate structure 250 to form a second intermediate structure 258 (illustrated in FIG. 4). To define the shape of magnetic material, removal of magnetic material 252 not otherwise blocked by mask 256 can be performed by ion milling, for example, by a standard inductive ion beam mill. However, magnetic material 252 can be removed using other techniques, such as reactive ion beam etching (RIBE).

As illustrated in FIG. 4, after shaping, a portion of substrate 254 and a portion of magnetic material 252 are removed. More particularly, magnetic material 252 is defined such that it includes a leading edge 249, a trailing edge 248 and a pair of opposing sidewalls 262 and 264. It should be noted that trailing edge 248 corresponds with the trailing edge 148 of write pole 116 illustrated in FIG. 1.

Figure 5:
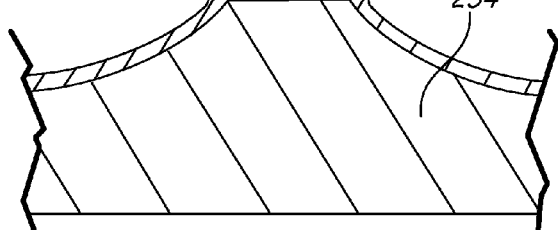
FIG. 5 illustrates a third intermediate structure formed during the fabrication of the transducer shown in FIG. 2.

At block 205, a first protective layer 266 is deposited on the second intermediate structure 258 to form a third intermediate structure 268 (illustrated in FIG. 5). First protective layer 266 is deposited such that it is in contact with portions of substrate 254 that were exposed to ion milling, in contact with sidewalls 262 and 264 of magnetic material 252 and portions of mask 256 not in contact with magnetic material 252. For example, first protective layer 266 can be formed with atomic depositon (ALD) and include a non-magnetic material, such as tantalum (Ta), ruthenium (Ru), copper (Cu), diamond-like carbon or other similar materials, such as alumina or various nitrides or carbides. In the method illustrated in FIG. 2, the steps 203 and 205 can be performed without breaking a vacuum. Performing these steps under a vacuum prevents sidewalls 262 and 264 from becoming damaged due to environmental conditions, such as moisture and exposure to oxygen. As soon as first protective layer 266 is deposited, concerns regarding the exposure of magnetic material 252 are eliminated and the vacuum can be broken.

Figure 6:
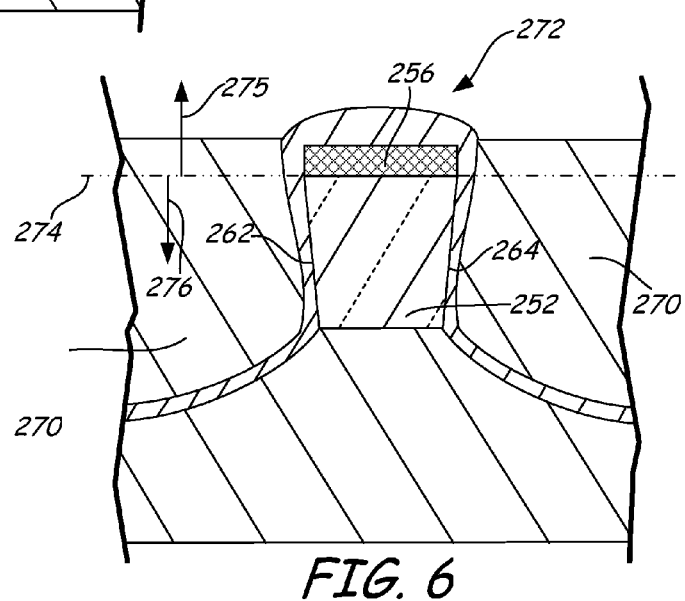
FIG. 6 illustrates a fourth intermediate structure formed during the fabrication of the transducer shown in FIG. 2.

At block 207, third intermediate structure 268 is backfilled with a backfill material 270 to form a fourth intermediate structure 272 illustrated in FIG. 6. For example, backfill material 270 can be an insulating material, such as alumina. As illustrated, backfill material 270 fills the spaces surrounding sidewalls 262 and 264 of magnetic material 252 of which were milled away during the step of shaping discussed in block 204. As also illustrated in FIG. 6, defined between magnetic material 252 and mask 256 includes a stop plane 274 dividing the structure 272 into a first portion 275 and a second portion 276. More particularly, stop plane 274 is defined by the interface between magnetic material 252 and mask 256.

Figure 7:
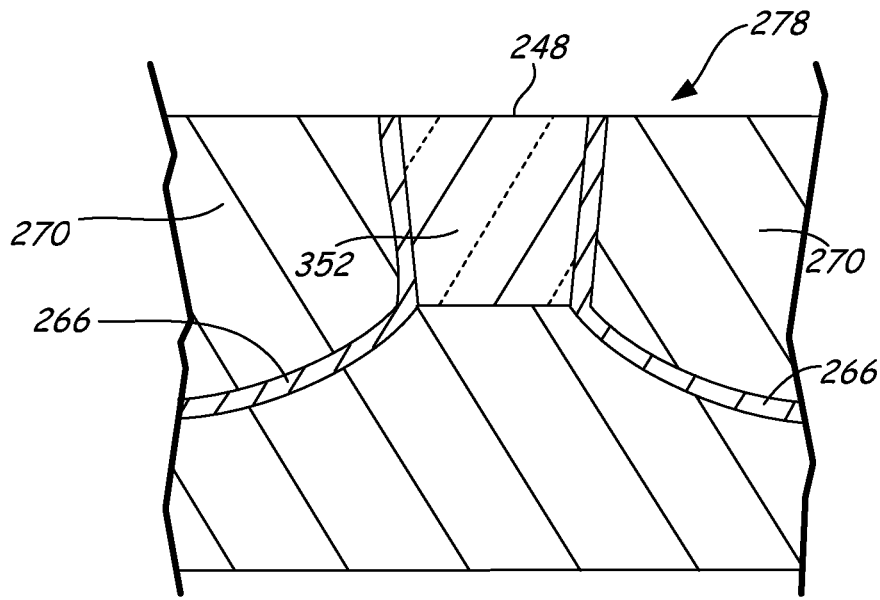
FIG. 7 illustrates a fifth intermediate structure formed during the fabrication of the transducer shown in FIG. 2.
Figure 8:
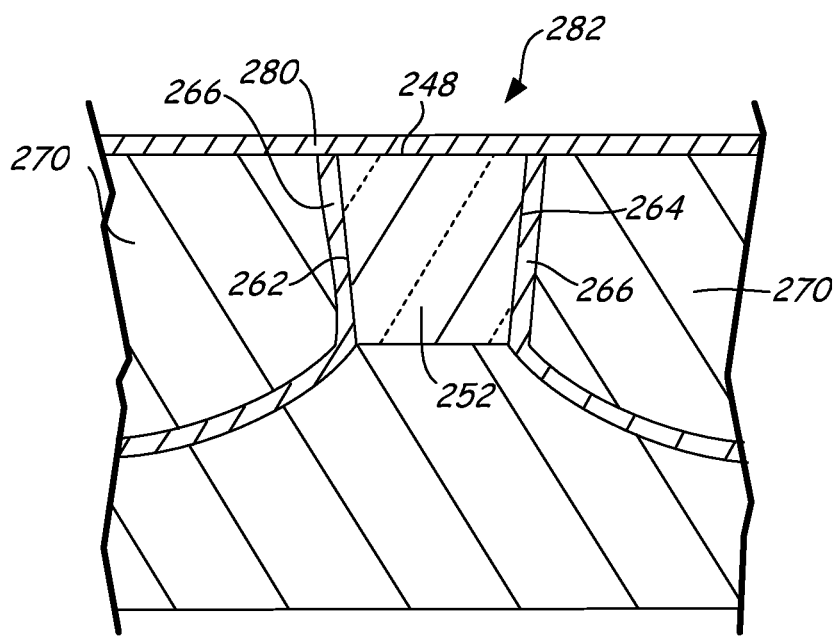
FIG. 8 illustrates a sixth intermediate structure formed during the fabrication of the transducer shown in FIG. 2.

At block 209, first portion 275 of fourth intermediate structure 272 is removed at stop plane 274 to form a fifth intermediate structure 278 (illustrated in FIG. 7). By removing first portion 275, a portion of first protective layer 266, a portion of backfill material 270 and mask 256 are removed to expose trailing edge 248 of shaped magnetic material 252.

At block 211, a second protection layer 280 is deposited on the fifth intermediate structure 278 to form a sixth intermediate structure 282. In particular, second protection layer 280 is deposited so as to cover backfill material 270, first protective layer 266 and trailing edge 248 of shaped magnetic material 252. Therefore, shaped magnetic material 252 is covered and protected by protective layers in contact with sidewalls 262 and 264 and on trailing edge 248. Like first protective layer 266, second protective layer 280 can include a non-magnetic material, such as tantalum (Ta), ruthenium (Ru), copper (Cu), diamond-like carbon or other similar materials, such as alumina or various nitrides or carbides.

Figure 9:
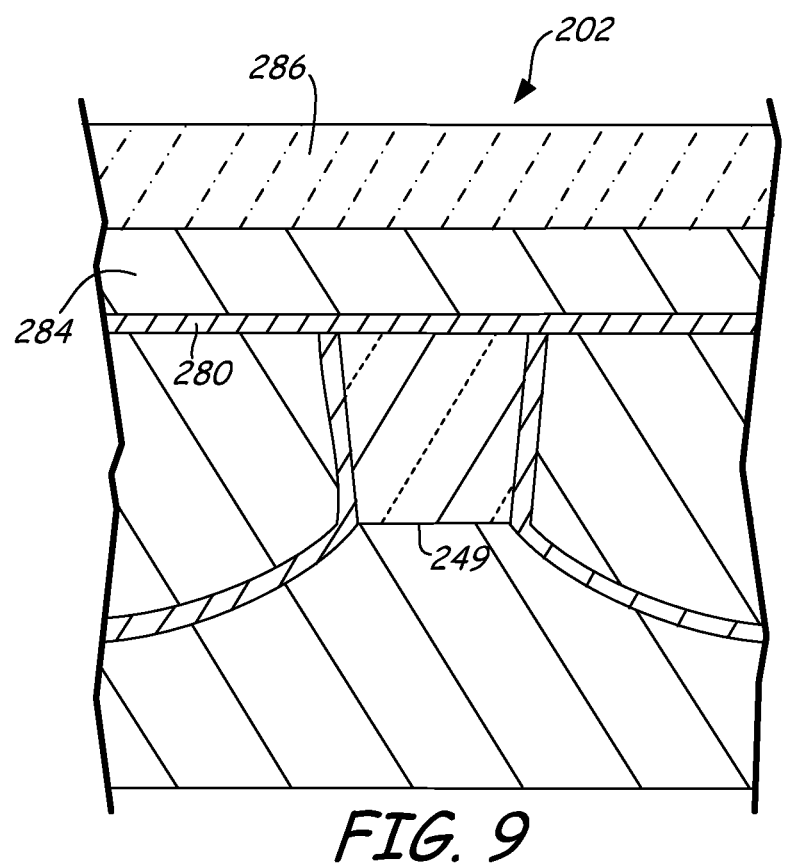
FIG. 9 illustrates a diagrammatic air bearing surface view of a portion of the transducer fabricated in FIG. 2.

At block 213, a gap material 284 is deposited on the sixth intermediate structure 282 (or as shown in FIG. 9 as deposited on second protective layer 280) to form a gap (such as the gap or space 120 illustrated in FIG. 1). A shield material 286 (not specifically illustrated in FIG. 1) is deposited on the gap material 284 to form a shield or front shield. The addition of gap material 284 and shield material 286 forms sixth intermediate structure 282 into at least a portion of a transducer 202. For example, gap material 284 can be an insulation material, such as alumina, and shield material 286 can be a magnetic material. As previously discussed, shield material 286 increases the field gradient at trailing edge 248 and improves transition quality.

Figure 10:
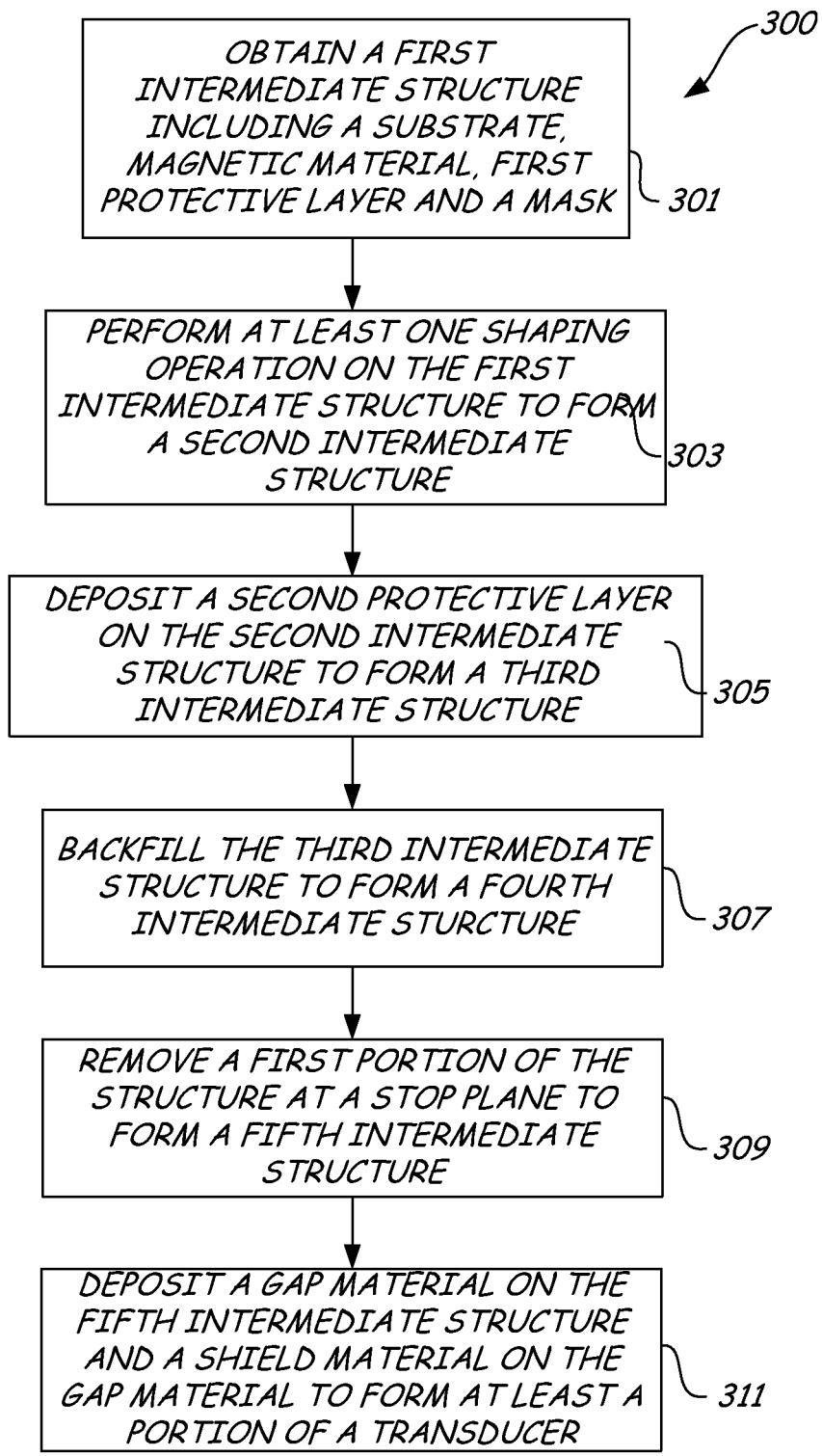
FIG. 10 is a flowchart illustrating a method of fabricating a transducer under another embodiment

FIG. 10 is a flowchart 300 illustrating another embodiment of a method of fabricating a transducer, such as transducer 102 of FIG. 1. In particular, flowchart 300 describes the method of fabricating a write pole, such as write pole 116 illustrated in FIG. 1. Flowchart 300 will be discussed in combination with the intermediate structures illustrated in FIGS. 11-16.

Figure 11:
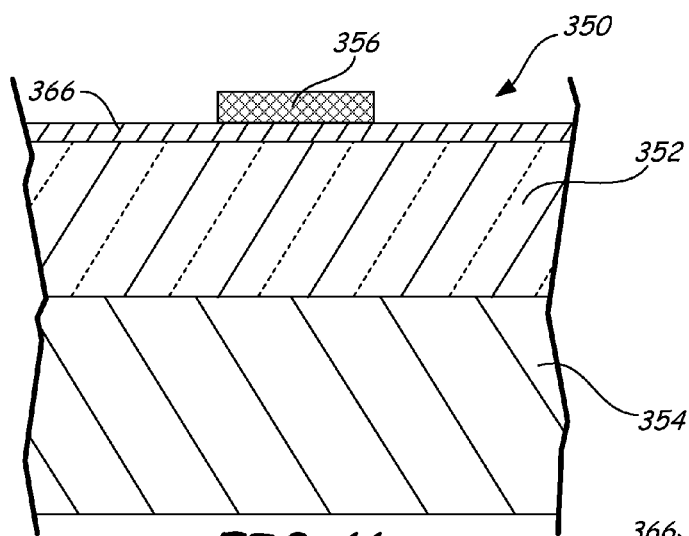
FIG. 11 illustrates a first intermediate structure formed during fabrication of the transducer shown in FIG. 10.

At block 301, a first intermediate structure 350, as illustrated in FIG. 11, is obtained. First intermediate structure 350 includes a magnetic material 352 formed on a substrate 354. Like magnetic material 252 of FIG. 3, magnetic material 352 can be FeCo or other type of 2.4 T iron cobalt. Like substrate 254, substrate 354 can be alumina or other type of insulation material. First intermediate structure 350 also includes a first protective layer 366 formed on magnetic material 352 and a mask 356 deposited on first protective layer 366. Like first protective layer 266 of FIG. 5, first protective layer 366 can include a non-magnetic material, such as tantalum (Ta), ruthenium (Ru), copper (Cu), diamond-like carbon or other similar materials, such as alumina or various nitrides or carbides. Like mask 256 of FIG. 3, mask 356 can be a photo resist or hard mask. Mask 356 is configured for use in defining the width of the write pole to be fabricated.

Figure 12:
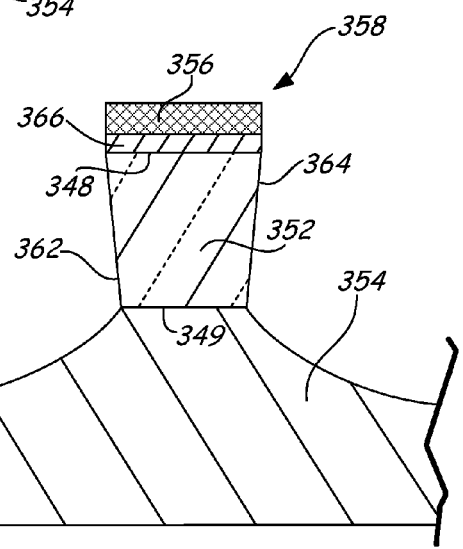
FIG. 12 illustrates a second intermediate structure formed during the fabrication of the transducer shown in FIG. 10.

At block 303, at least one shaping operation is performed on first intermediate structure 350 to form a second intermediate structure 358 (illustrated in FIG. 12). To define the shape of magnetic material, removal of magnetic material 352 and first protective layer 366 not otherwise blocked by mask 356 can be performed by ion milling or other techniques, such as reactive ion beam etching (RIBE). As illustrated in FIG. 12, after shaping, a portion of substrate 354, a portion of magnetic material 252 and a portion of first protective layer 366 are removed. More particularly, magnetic material 352 is defined such that it includes a trailing edge 348, a leading edge 349 and a pair of opposing sidewalls 362 and 364. It should be noted that trailing edge 348 corresponds with the trailing edge 148 of write pole 116 illustrated in FIG. 1.

Figure 13:
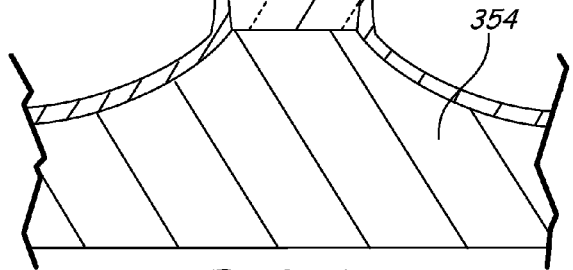
FIG. 13 illustrates a third intermediate structure formed during the fabrication of the transducer shown in FIG. 10.

At block 305, a second protective layer 380 is deposited on the second intermediate structure 358 to form a third intermediate structure 368 (illustrated in FIG. 13). Second protective layer 366 is deposited such that it is in contact with portions of substrate 354 that were exposed to ion milling, in contact with sidewalls 362 and 364 of magnetic material 352 and sides of first protective material 366 and portions of mask 356. Therefore, shaped magnetic material 352 is covered and protected by protective layers in contact with sidewalls 362 and 364 and on trailing edge 348. Like first protective layer 366, second protective layer 380 can include a non-magnetic material, such as tantalum (Ta), ruthenium (Ru), copper (Cu), diamond-like carbon or other similar materials, such as alumina or various nitrides or carbides.

In the method illustrated in FIG. 10, the steps 303 and 305 can be performed without breaking a vacuum. Performing these steps under a vacuum prevents sidewalls 362 and 364 from becoming damaged due to environmental conditions, such as moisture and exposure to oxygen. As soon as first protective layer 366 and second protective layer 380 are deposited, concerns regarding the exposure of magnetic material 352 are eliminated and the vacuum can be broken.

Figure 14:
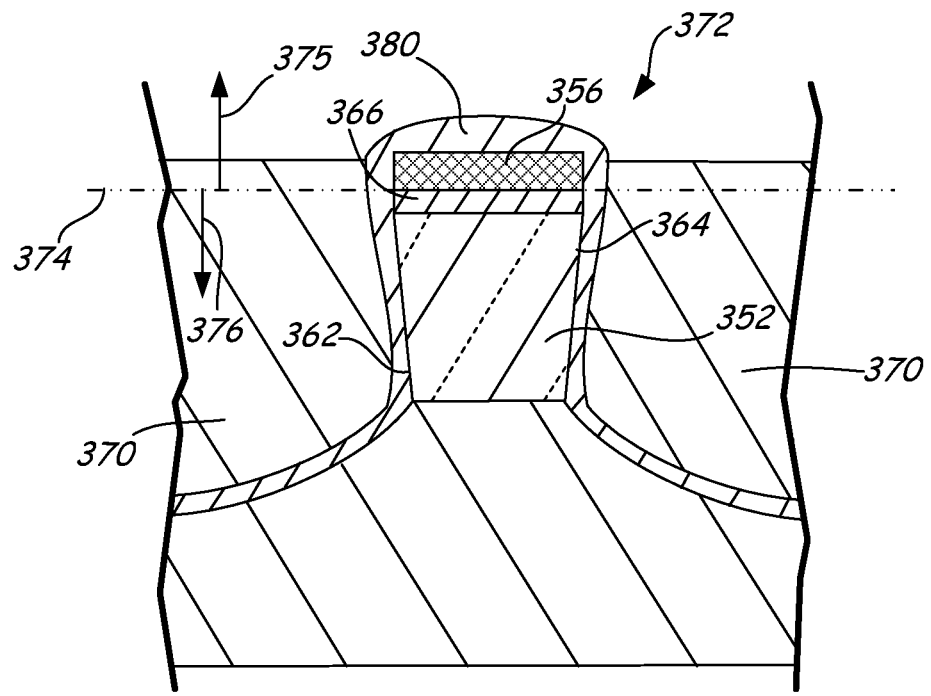
FIG. 14 illustrates a third intermediate structure formed during the fabrication of the transducer shown in FIG. 10.
Figure 15:
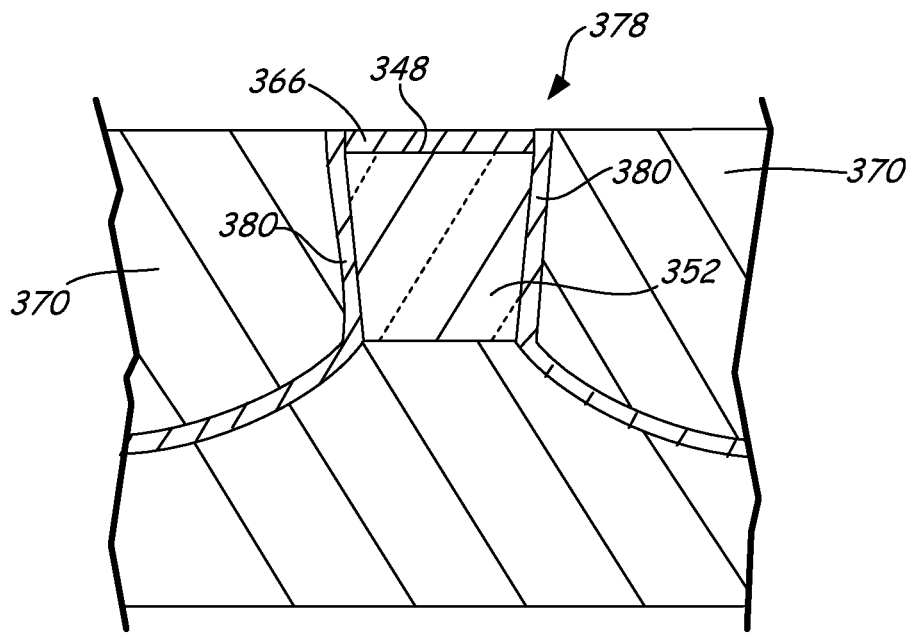
FIG. 15 illustrates a fourth intermediate structure formed during the fabrication of the write pole shown in FIG. 10.

At block 307, third intermediate structure 368 is backfilled with a backfill material 370 to form a fourth intermediate structure 372 (illustrated in FIG. 14). Like backfill material 270, backfill material 370 can be an insulating material, such as alumina. As illustrated, backfill material 370 fills the spaces surrounding sidewalls 362 and 364 of magnetic material 352 of which were milled away during the step of shaping discussed in block 303 and coated with second protective layer 380. As also illustrated in FIG. 14, defined between magnetic material 352 and mask 356 includes a stop plane 374 dividing the structure 372 into a first portion 375 and a second portion 376. More particularly, stop plane 374 is defined by the interface between first protective layer 366 and mask 356.

At block 309, first portion 375 of fourth intermediate structure 372 is removed at stop plane 374 to form a fifth intermediate structure 378 (illustrated in FIG. 7). By removing first portion 375, a portion of second protective layer 380, a portion of backfill material 370 and mask 356 are removed to expose first protective layer 366 formed on trailing edge 348 of shaped magnetic material 352.

Figure 16:
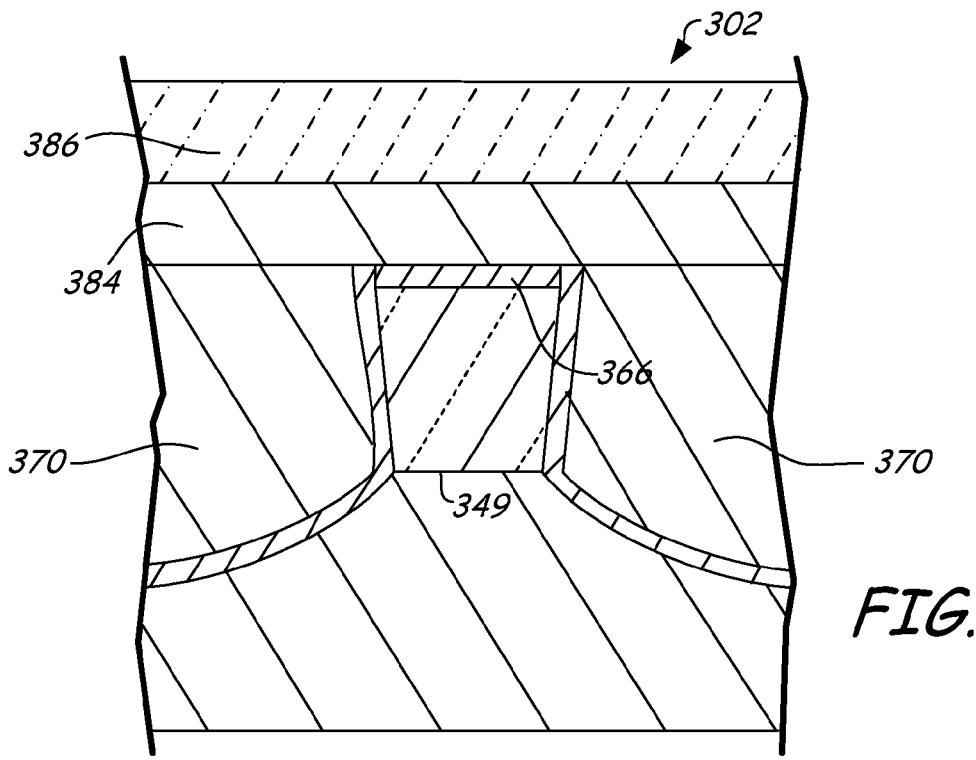
FIG. 16 illustrates a diagrammatic air bearing surface view of a portion of the transducer fabricated in FIG. 10.

At block 311, a gap material 384 is deposited on the sixth intermediate structure 382 (or as shown in FIG. 16 as deposited on second protective layer 366 and backfill 370) to form a gap (such as the gap or space 120 illustrated in FIG. 1). A shield material 386 (not specifically illustrated in FIG. 1) is deposited on the gap material 384 to form a shield or front shield. The addition of gap material 384 and shield material 386 forms sixth intermediate structure 382 into at least a portion of a transducer 302. For example, gap material 384 can be an insulation material, such as alumina, and shield material 386 can be a magnetic material. As previously discussed, shield material 386 increases the field gradient at trailing edge 348 and improves transition quality.

Figure 17:
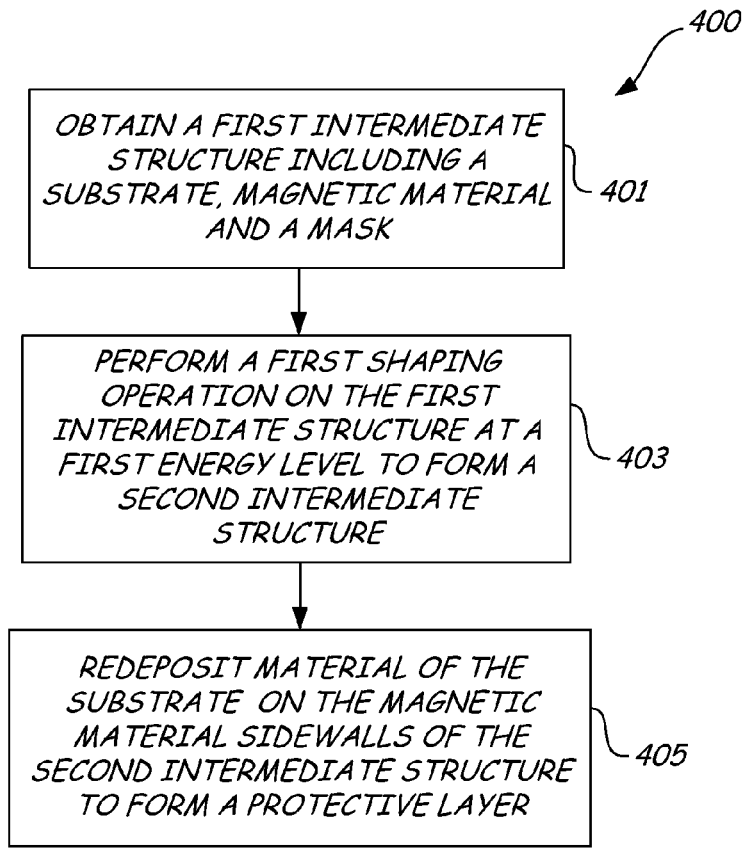
FIG. 17 is a flowchart illustrating a method of fabricating a transducer under yet another embodiment.

FIG. 17 is a flowchart 400 illustrating another embodiment of a method of fabricating a transducer, such as transducer 102 of FIG. 1. In particular, flowchart 400 describes the method of fabricating a write pole, such as write pole 116 illustrated in FIG. 1. Flowchart 400 will be discussed in combination with the intermediate structures illustrated in FIGS. 18-20.

Figure 18:
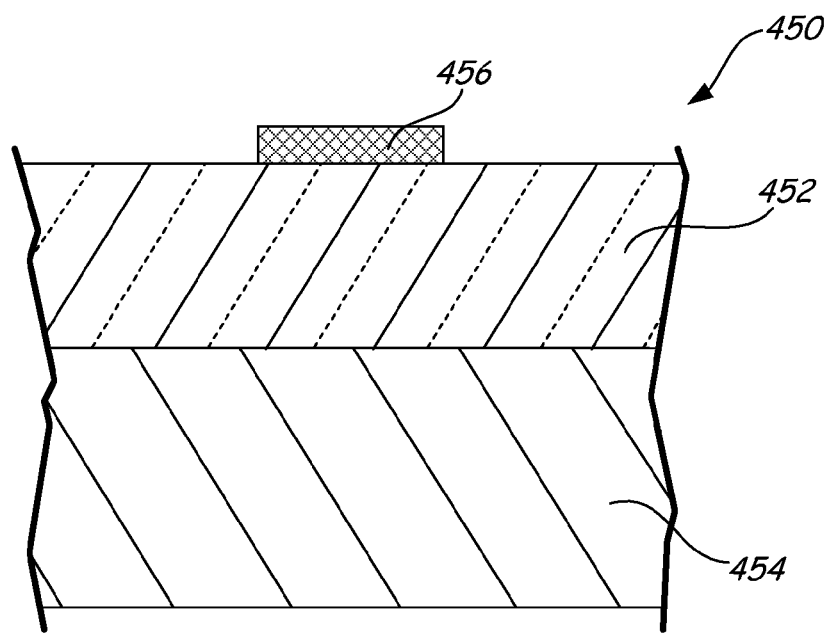
FIG. 18 illustrates a first intermediate structure formed during fabrication of the transducer shown in FIG. 17.

At block 401, a first intermediate structure 450, as illustrated in FIG. 18, is obtained. First intermediate structure 450 includes a magnetic material 452 formed on a substrate 454. Like magnetic material 252 of FIG. 3 and 352 of FIG. 11, magnetic material 452 can be FeCo or other type of 2.4 T iron cobalt. Like substrate 254 and substrate 354, substrate 454 can be alumina or other type of insulation material. First intermediate structure 450 also includes a mask 456 deposited on magnetic material 452. For example, mask 256 can be a photo resist or hard mask. Mask 256 is configured for use in defining the width of the write pole that is fabricated. In general, the width of the write pole should correspond to the width of a track on the storage medium.

Figure 19:
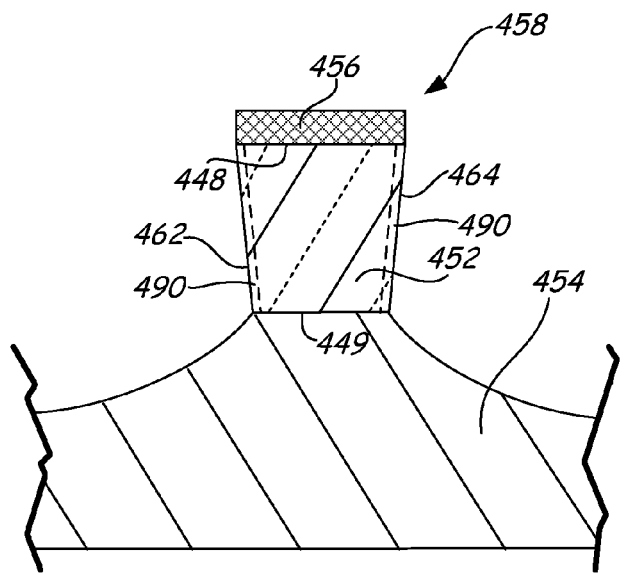
FIG. 19 illustrates a second intermediate structure formed during the fabrication of the transducer shown in FIG. 17.

At block 403, at least one shaping operation is performed on first intermediate structure 450 to form a second intermediate structure 458 (illustrated in FIG. 19). To define the shape of magnetic material, removal of magnetic material 452 not otherwise blocked by mask 456 can be performed by ion milling or other techniques, such as reactive ion beam etching (RIBE), at a first level of energy to form second intermediate structure 458. In particular, the first shaping operation can be performed by an inductive ion beam mill. As illustrated in FIG. 19, after shaping, a portion of substrate 454 and a portion of magnetic material 452 are removed. More particularly, magnetic material 452 is defined such that it includes a leading edge 449, a trailing edge 448 and a pair of opposing sidewalls 462 and 464. It should be noted that trailing edge 448 corresponds with the trailing edge 148 of write pole 116 illustrated in FIG. 1.

However, after the first shaping operation is performed on magnetic material 452, formation of reaction zones or dead layers 490 of an uncontrolled thickness occur on the sides of magnetic material 452. Formation of dead layers 490 can be caused by various reasons. For example, argon beams bombarding the sidewalls 462 and 464 of the device during ion milling can cause ion induced physical damage. In another example, after magnetic material 452 is defined by ion milling, it can be exposed to atmosphere for transition to other fabricating processes. Due to the atmospheric exposure of the freshly ion milled device, oxygen and water moisture can readily react with the device edges to form dead layers 490. In yet another example, subsequent oxidation to the sidewalls 462 and 464 can occur from an alumina hard mask or other layers of alumina.

Figure 20:
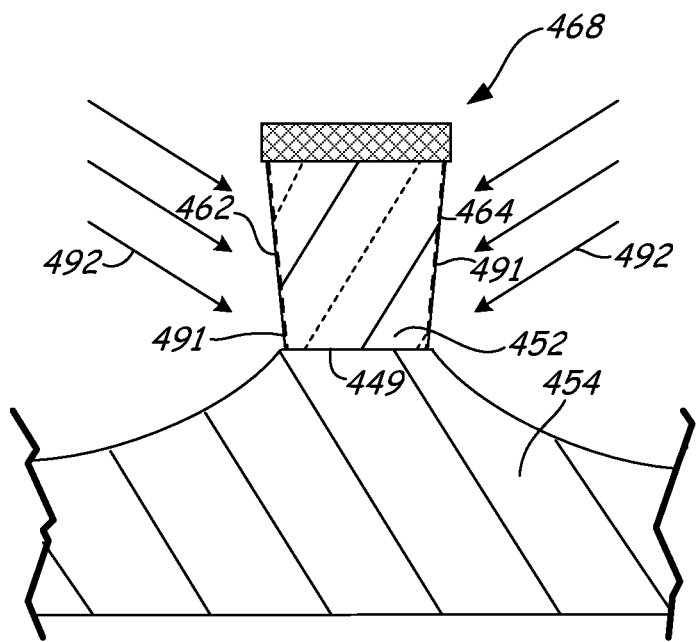
FIG. 20 illustrates a third intermediate structure formed during the fabrication of the transducer shown in FIG. 17.

If in fact dead layers 490 form on magnetic material 452, the thickness of dead layers can be removed or reduced by performing a second shaping operation on magnetic material 452 to form a third intermediate structure 468 as illustrated in FIG. 20. The second shaping operation can be performed by ion milling or other techniques, such as RIBE at a second level of energy. In particular, the second shaping operation can be performed using a magneto-resistance ion beam mill. The second level of energy is at a reduced amount or less amount of energy than the first level of energy. Performing the second shaping operation at a lower power means that the new damage or dead layers 491 on sidewalls 462 and 464 of magnetic material will be smaller in comparison to the damaged or dead layers 490 formed under the first shaping operation. As also illustrated in FIG. 20, the second shaping operation on the second intermediate structure 458 is performed at a first angle 492 relative to a position normal to an interface between the magnetic material 452 and substrate 454 (i.e., normal to leading edge 449 of magnetic material 452).

Figure 21:
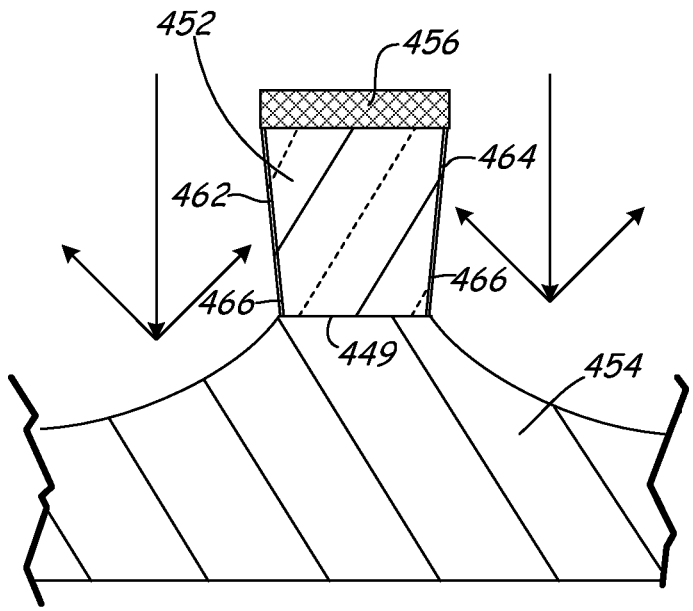
FIG. 21 illustrates a fourth intermediate structure formed during the fabrication of the transducer shown in FIG. 17

At block 405 and as illustrated in FIG. 21, material of substrate 454 is redeposited on sidewalls 462 and 464 of magnetic material 452 of the second intermediate structure 458 or third intermediate structure 468 using ion beam bombardment to form a protective or encapsulation layer 466 on sidewalls 462 and 464. In particular, the step of performing ion beam bombardment to redeposit substrate material from substrate 454 onto sidewalls 462 and 464 is performed at a position normal to an interface between the magnetic material 452 and substrate 454 (i.e., normal to leading edge 449 of magnetic material 452). As illustrated in FIG. 21, the normal position of the ion beam bombardment causes the alumina of substrate 454 to loosen from the substrate and deposit onto the sidewalls 462 and 464. Both the second shaping operation illustrated in FIG. 20 and the redepositing operation illustrated in FIG. 21 can be performed using a magneto-resistance ion beam mill at the second level of energy, which is a lower energy level than that of the energy level to perform the first shaping operation illustrated in FIG. 19.

It should be understood that it is possible that all of the steps illustrated in FIGS. 19-21 can be performed in a single chamber without breaking vacuum. In addition, it should be realized that the redepositing operation with ion beam bombardment performed at a position normal to leading edge 449 will not affect the critical dimension (i.e., width) of the transducer under fabrication because at the point illustrated in FIG. 21, magnetic material 452 is still covered by mask 456.

It is to be understood that even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles of the disclosure to the full extent indicated by the broad general meaning of the terms in which the appended claims are expressed. For example, the particular elements may vary depending on a type of transducer while maintaining substantially the same functionality without departing from the scope and spirit of the present invention. In addition, although the embodiments described herein are directed to protecting a write pole during fabrication, it will be appreciated by those skilled in the art that the teachings of the present invention can be applied to other components of other types of transducers during fabrication, without departing from the scope and spirit of the present invention.

What is claimed is:

1. A method of fabricating a transducer comprising:
   obtaining a first intermediate structure including magnetic material formed on a substrate and a mask deposited on the magnetic material;
   performing a first shaping operation on the first intermediate structure to form a second intermediate structure, the shaped magnetic material in the second intermediate structure including a trailing edge, a leading edge and a pair of sidewalls extending between the trailing edge and the leading edge; and
   redepositing material of the substrate on and in contact with the sidewalls of the shaped magnetic material in the second intermediate structure to form a protective layer,
   wherein the first shaping operation on the first intermediate structure is carried out using ion beam bombardment at a first level of energy and the redepositing material of the substrate on and in contact with the sidewalls of the shaped magnetic material in the second intermediate structure to form a protective layer is carried out using ion beam bombardment, and
   performing a second shaping operation to the second intermediate structure using ion beam bombardment at a second level of energy to form a third intermediate structure, the second level of energy being less than the first level of energy.

2. The method of claim 1, wherein the step of performing a first shaping operation are performed using an inductive ion beam mill.

3. The method of claim 1, wherein the step of performing a second shaping operation are performed using a magneto-resistance ion beam mill.

4. The method of claim 1, wherein the second shaping operation on the second intermediate structure is performed at a first angle relative to a position normal to the leading edge of the shaped magnetic material.

5. The method of claim 4, wherein the step of redepositing of the material of the substrate on the sidewalls of the shaped magnetic material in the second intermediate structure using ion beam bombardment is performed at the position normal to the leading edge.

6. The method of claim 5, wherein the second shaping operation performed of the second intermediate structure and the redepositing of the material of the substrate on the sidewalls of the shaped magnetic material in second intermediate structure are performed using a magneto-resistance ion beam mill at the second level of energy.

7. The method of claim 1 and wherein the magnetic material formed on the substrate comprises FeCo.

8. The method of claim 1 and wherein the substrate is formed of a material that comprises $Al_2O_3$.

9. A method of fabricating a transducer comprising:
   obtaining a first intermediate structure including a magnetic material formed on a substrate and a mask deposited on the magnetic material, wherein defined between the magnetic material and the mask includes a stop plane dividing the structure into a first portion and a second portion;
   performing at least one shaping operation on the first intermediate structure to form a second intermediate structure;
   depositing a first protective layer of non-magnetic material on the second intermediate structure to form a third intermediate structure;
   backfilling the third intermediate structure with an insulating material to form a fourth intermediate structure; and
   removing the first portion of the structure at the stop plane including a portion of the backfilled insulating material, the mask and a portion of the first protective layer to form a fifth intermediate structure.

10. The method of claim 9, wherein the first intermediate structure further comprises a second protective layer of non-magnetic material positioned on and in contact with the magnetic material, the mask deposited on and in contact with the second protective layer of non-magnetic material.

11. The method of claim 10, further comprising depositing a gap material on the fifth intermediate structure and depositing a shield material on the gap material to form at least a portion of the transducer, wherein the gap material includes an insulating material and the shield material includes a magnetic material.

12. The method of claim 9, further comprising depositing a second protective layer of non-magnetic material on the fifth intermediate structure to form a sixth intermediate structure.

13. The method of claim 12, further comprising depositing a gap material on the sixth intermediate structure and depositing a shield material on the gap material to form at least a portion of the transducer, wherein the gap material includes an insulating material and the shield material includes a magnetic material.

14. The method of claim 9, wherein the steps of shaping first intermediate structure to form the second intermediate structure and depositing a first protective layer of non-magnetic material to form a third intermediate structure are both performed under a vacuum.

15. The method of claim 9, wherein the at least one shaping operation is performed using ion beam milling.

16. The method of claim 9 and wherein the first protective layer is formed of a material that comprises at least one of tantalum (Ta), ruthenium (Ru), copper (Cu) or diamond-like carbon.

* * * * *